March 7, 1950  J. A. SPRAGUE  2,499,691
SELECTIVELY-ACTIVE INFINITY STOP FOR CAMERAS
Filed July 8, 1947  3 Sheets-Sheet 2
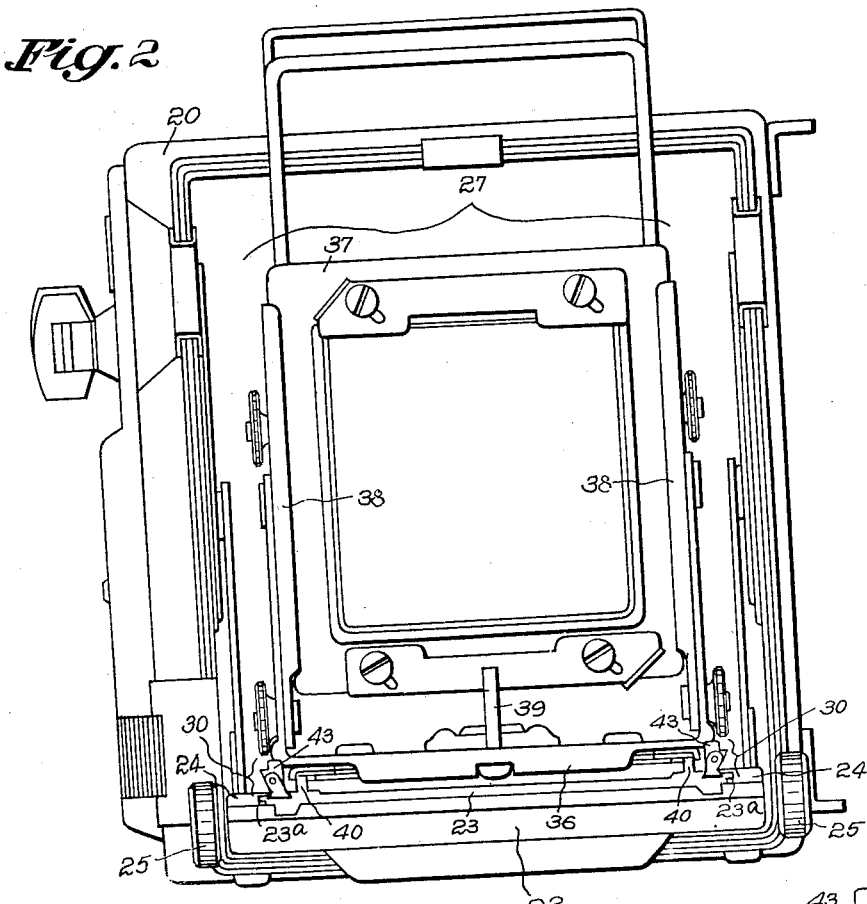
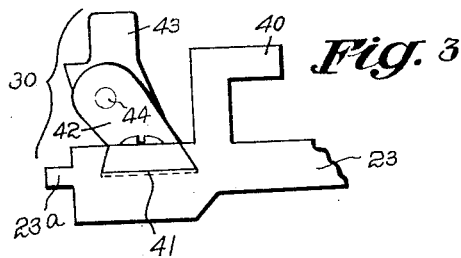
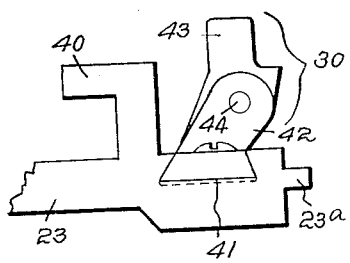
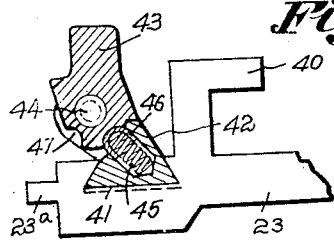
INVENTOR.
JOSEPH A. SPRAGUE
BY
ATTYS.

March 7, 1950 J. A. SPRAGUE 2,499,691
SELECTIVELY-ACTIVE INFINITY STOP FOR CAMERAS
Filed July 8, 1947 3 Sheets-Sheet 3
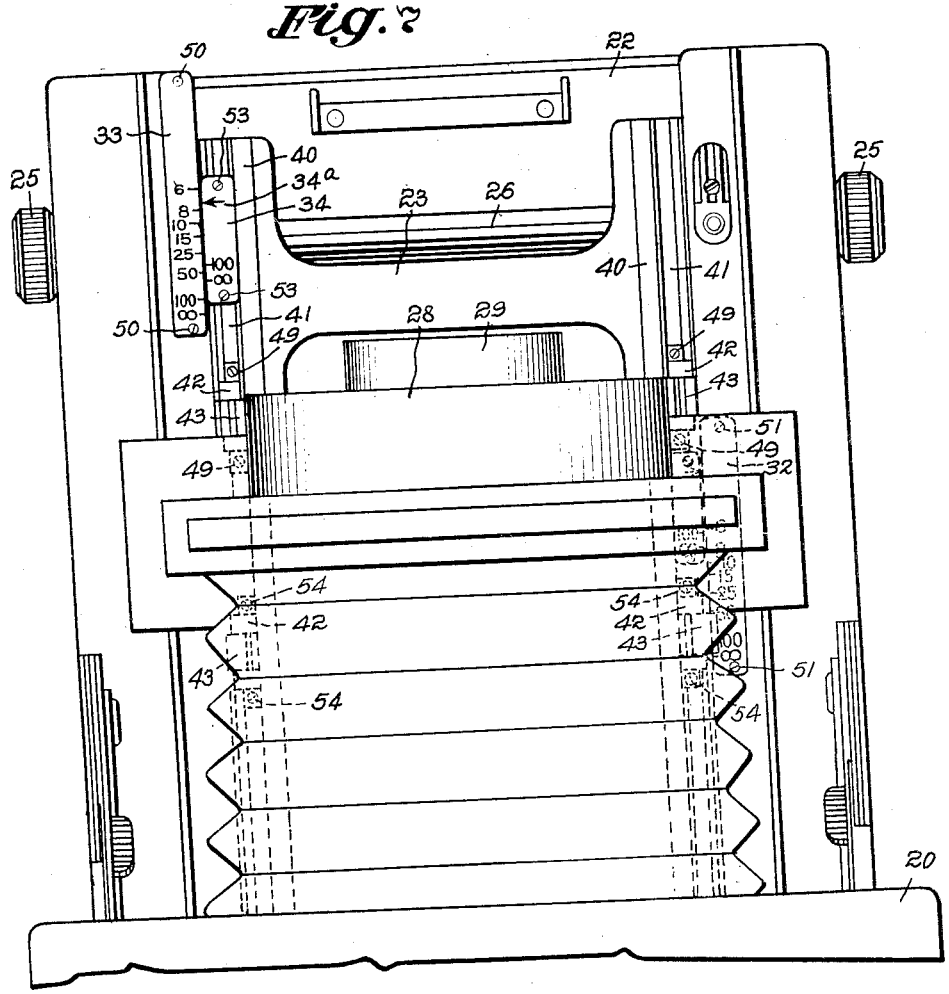
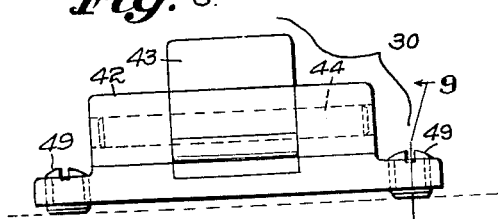
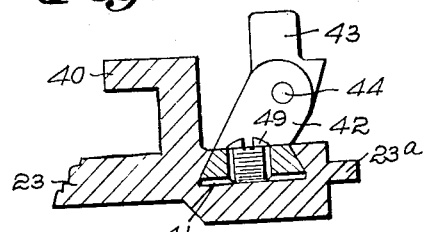
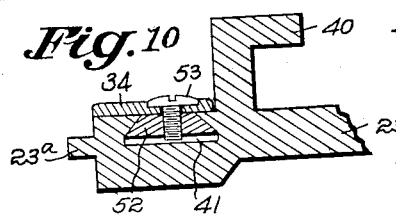
INVENTOR.
JOSEPH A. SPRAGUE
BY
ATTYS Patented Mar. 7, 1950

2,499,691

UNITED STATES PATENT OFFICE 2,499,691

SELECTIVELY ACTIVE INFINITY STOP FOR CAMERAS

Joseph A. Sprague, Honeoye Falls, N. Y., assignor to Graflex, Inc., Rochester, N. Y., a corporation of Delaware Application July 8, 1947, Serial No. 759,645

5 Claims. (Cl. 95—46)

This invention relates to selectively-active infinity stops for cameras.

In order that the principle of the invention may be readily understood, I have disclosed a single embodiment thereof in the accompanying drawings, wherein—

Fig. 1 is a top plan view of a folding camera equipped with my invention, it having two sets of infinity stops and two separate focusing scales, the pair or set of infinity stops for use with the shorter focal-length lens being shown in position for stopping the camera front in proper position for that particular lens, and the focusing scale on the right-hand side of the camera being the one for use in such instance;

Fig. 2 is a front elevation of the camera equipped with my invention and showing the positioning of the infinity stops with respect to the camera front;

Fig. 3 is an enlarged fragmentary detail of one side of the camera track having fitted thereto one of the infinity stops;

Fig. 4 is a view similar to Fig. 3, but showing the right-hand side of the track that is represented in Fig. 2;

Fig. 5 is a view similar to Fig. 3, but wherein the infinity stop is represented in cross section, more clearly to show the construction thereof, it being in active position to stop the camera front;

Fig. 6 is a view similar to Fig. 5, the infinity stop, however, being shown in inactive or inoperative position;

Fig. 7 is a view similar to Fig. 1, but wherein the second set of infinity stops is active or in use, the camera front having passed over the first set of infinity stops, and the longer focal length lens being used, and its associated focusing scale being in position as shown on the left-hand side of the camera;

Fig. 8 is a side elevation of one of the infinity stops removed from the camera;

Fig. 9 is a vertical section taken through Fig. 8 on the line 9—9 thereof; and

Fig. 10 is a fragmentary vertical section of the camera track showing the mounting of one element of the focusing scale.

Figure 1:
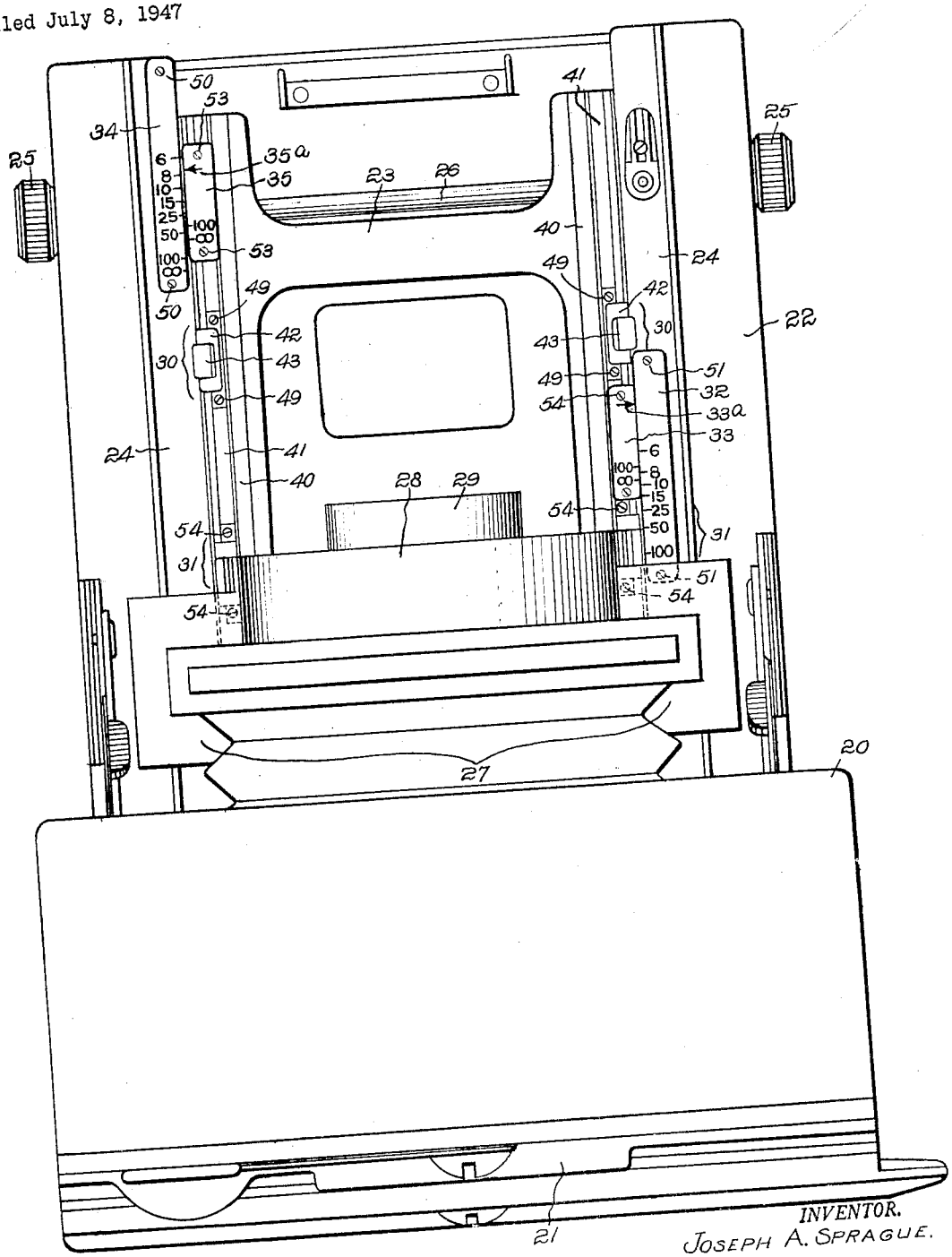

In cameras of the folding type, the camera front assembly, being that part of the camera which carries the lens, is positioned on a movable track for focusing, and since a part of the focusing scale is carried by the camera track and in most instances range finders are controlled or operated through or by the camera track, it will be evident that it is necessary that the camera front be set accurately at the desired position on the track so that the focusing scale will read accurately and the range finder will be accurately calibrated. If only a single lens of a specific focal length is used, this does not become a difficult problem since a fixed stop, such as a block clamped to the track, will serve properly to position the camera front on the track. When, however, a camera is equipped with two or more interchangeable lenses of different focal lengths, as is frequently the case, each having its own focusing scale, it becomes important that two or more alternative positions for the camera front be selected on the camera track, according to the lens that is used. I have provided improved means including selectively active, pivotally mounted infinity stops co-operating with two or more interchangeable lenses of different focal length. I am well aware of the construction disclosed in the patent to Steiner, No. 2,302,584, dated November 17, 1942 (assigned, as is also this application, to Graflex, Inc., of Rochester, New York), and the present invention was made to overcome the disadvantages of that construction. In the said Steiner patent, there is only a single pair of infinity stops, and in order to use lenses of different focal length, it was necessary to adjust the one pair of infinity stops to another position.

The objects of this invention are: to provide a camera track so constructed that it will readily receive one or more pairs of improved infinity stops that can be adjusted along said track and securely locked thereto; to provide improved infinity stops that can be selectively positioned on the camera track for determining the position of the camera front or allowing the camera front to pass over them; to provide a camera track having means for positioning and locking thereto one element of one or more focusing scales; and to provide a camera having a track to receive one or more focusing scales with means to adjust the focusing scales along said track.

Referring first to Figs. 1, 2 and 7, the camera box is indicated at 20, the camera back at 21, the camera bed at 22, the camera track at 23 and camera track guide rails at 24, 24, into which is slidably fitted the camera track 23. The focusing knobs are indicated at 25, 25, the focusing knob shaft therefor at 26 and the camera front at 27, which is provided with a shutter 28 of any suitable type, and a lens 29. The said lens 29 is carried by a lens board or the like, and said lens board can be readily removed from the camera front 27 and another lens board substituted having a lens of a different focal length. More than two such lens boards, each having a lens of a different focal length from the others, may be provided, and any one of said lens boards with its lens can be quickly substituted.

The camera front 27 can be positioned along the camera track 23 in any well known manner, as, for example, in the manner clearly disclosed in the United States patent to Oscar Steiner, No. 2,233,352, dated February 25, 1941.

As shown generally in Figs. 1 and 2 and in detail in Figs. 3 to 6, 8 and 9, the front infinity stops (of which there are desirably two) are indicated at 30, 30, and the rear infinity stops (of which there are also desirably two) are indicated at 31, 31. The said infinity stops are all mounted upon the camera track 23, each in its own fixed but adjustable predetermined position, as hereinafter fully described. The two pairs of infinity stops 30 and 31 are respectively of identical structure, and in the detailed description of the said stops I shall refer only to a stop or stops 30, it being understood that the corresponding infinity stops 31 are of the same construction.

The infinity stops 30, 30 are used for lenses of relatively long focal length, and the infinity stops 31, 31 are used for lenses of standard focal length or shorter. In intimate cooperation and co-action with the said pairs or sets of infinity stops, respectively, are provided the stationary scale element 32 of the focusing scale used for the standard focal length lens, and the movable scale element 33 of the focusing scale that is moved with the camera track 23, while the stationary scale element of the forward focusing scale is shown at 34 and the movable scale element of the forward stationary scale is shown at 35. These scales will be described in detail following the description of the infinity stops.

While the term "infinity" stop is employed, it is to be understood that my invention contemplates selectively active stops that may be used for distances other than "infinity," and the term "infinity" stop is so used herein.

It is also to be understood that if a third or even a fourth lens of different focal length be provided for interchangeable use in the camera, the number of pairs or sets of selectively active infinity stops will equal the number of such lenses. Also, within the scope of the invention a single selectively active infinity stop may be provided for each lens, though preferably a pair thereof is employed, one on each side of the camera.

In Fig. 2 the camera is shown in front elevation as having the lens and shutter removed. The camera front 27 is made up of a U-shaped member 36, a bellows support member 37, bellows support member channels 38, 38 and a clamp device of any suitable construction controlled by a lever 39. When the said clamp device is in the position shown in Fig. 2, the camera front 27 can be moved along the camera track 23 until stopped by the infinity stops 30 or 31, depending on the selective positioning of the said stops. The lever 39 is then turned either to the left or to the right, thus clamping the camera front 27 to the camera track 23 and in the position determined by the infinity stops 30 or 31. The camera track 23 is provided with a key on either side, indicated at 23a in Figs. 2 to 6, that fits into a suitable key-way provided therefor in the side rails 24, 24. The camera track 23 is provided with a rail on either side thereof, indicated at 40 in Figs. 2 to 6, to overlie the lateral edges of the camera front, which is free to slide along the rails 40 until stopped by one of the infinity stops 30 or 31, depending upon which is selectively positioned. The camera track 23 is provided with dovetail grooves, indicated at 41 in Figs. 3 to 6, 9 and 10, into which are fitted the said infinity stops.

In Fig. 8 is shown a side view of one of the improved infinity stops 30 removed from the camera track, and in Figs. 3 and 4 the two infinity stops 30 are shown fitted into the dovetail grooves 41. The improved infinity stops 30 and 31 are each made up of a basal casting or like member 42 having a hinged member 43 held in place by a pin 44. Each hinged member is free to be turned or rocked on a pin 44 but is limited in its motion by a detent made up of a coiled spring 45 having a cap 46 that engages with either notch 47 or 48 of the hinged member 43. Each infinity stop 30 is locked in position in the respective dovetail groove 41 by means of clamp screws 49, 49, shown in Figs. 8 and 9, by loosening which the said infinity stops 30 can be positioned anywhere along the camera track 23 and then clamped securely in position.

When the infinity stop is in the position shown in Fig. 6, it is selectively inactive and the camera front 27 can be readily moved on the rails 40 without interference by the member 43 of such infinity stop. However, when the infinity stops 30 are in the position shown in Figs. 3, 4 and 5, they are selectively active and the camera front 27 will be engaged by the camera track 23. If it is desired to move the camera front 23 beyond the rear pair or set of infinity stops, herein indicated at 31, the hinged member 43 of said stops are simply turned or rocked on their pins 44 into a position to disengage such members 43 from the camera front 27, which can then be moved to the next set of infinity stops, herein indicated at 30, which are selectively active, and therefore the camera front will be accurately located in a new position.

My invention is not limited to the provision of only two pairs or sets of infinity stops, since as many pairs or sets of infinity stops will be provided as there are interchangeable lenses of different local length. Ordinarily, however, two pairs or sets are sufficient, and preferably there are two stops for each different lens.

In accordance with my invention, there is provided means for accurately positioning focusing scales, which are usually composed in part of stationary scale elements (such as are indicated at 32 and 34) having so-called "witness" marks 33a and 35a, which latter are usually some suitable indication on the camera, such as a scribe line or an arrow permanently marked or placed thereon. In the present embodiment of my invention, the focusing stationary scale elements 34 and 32 are attached to the camera-track guide rails 24 by means of screws 50, 50 and 51, 51 respectively, and I have also provided a second or cooperating scale member made up of the movable scale elements 33 and 35 having an index arrow or "witness" mark 33a, 35a respectively, instead of, as before, providing them upon stationary scales and which can be aligned with any of the figures 6 to 50 to indicate such footage position. For the positions 100 feet and infinity, I have herein provided separate vernier marks on the focusing, movable scale elements 33 and 35, since this allows greater separation between these two points on the focusing scales, and, when focusing for 100 feet, the mark "100" on the stationary focusing scale element is aligned with the mark "100" on the corresponding movable focusing scale element. The same procedure is followed when focusing at infinity, that is, the two infinity marks are aligned. The movable focusing scale elements 33 and 35 are attached to the camera track 23 and to the dovetail groove 41 in the manner most clearly indicated in Fig. 10, wherein the dovetail groove 41 is provided with a key 52 into which is threaded a clamp screw 53. When the clamp screw 53 is loosened, the focusing movable scale elements 33 or 35 can be positioned along the camera track 23, and, when in the desired position, can be securely clamped thereto by tightening the screw 53 or 54.

The so-called "infinity" stops 30, 30 and 31, 31 may also be termed "distance" stops, being for distances in excess of substantially a hundred feet. The principle of rendering stops selectively active or inactive, as disclosed herein, is not limited to use with infinity stops, but may be used for any suitable distance, such, for example, as substantially a hundred feet or more.

I have disclosed novel means for quickly positioning a camera front on the camera track when lenses of different focal length are interchanged on the camera. Heretofore, when making such a change of lenses, it has been customary for the camera operator to readjust the infinity stops each time he changed lenses on his camera as in said patent to Steiner, No. 2,302,584. This is a difficult operation because it becomes necessary for the operator accurately to focus the camera on an object in the infinity position and then to adjust the infinity stops accordingly. In my invention these infinity stops need only be adjusted once for each lens of a given focal length. The infinity stops can then be used selectively as described, depending on what lens is used. This is a very important feature on cameras that are used by professionals and more particularly by press photographers.

Having thus described one illustrative embodiment of the invention, it is to be understood that although specific terms are employed, they are used in a generic and descriptive sense, and not for purposes of limitation, the scope of the invention being set forth in the following claims.

I claim:

1. In a photographic camera having a camera bed provided with a camera track that is itself provided in its upper face with at least one longitudinally extending dove-tailed groove, a track stop for the camera fronts of photographic cameras, wholly past which such a camera front may be moved when such track stop is in non-functioning position, such camera front being movable along a path that is intersected by said track stop when in focusing position, said track stop comprising a camera track-engaging block constituting a basal member of the stop having a bottom portion thereof extending into said dove-tailed groove and movable therealong into selected position, track-penetrating means for securing said basal member with said bottom portion in said longitudinally extending dove-tailed groove of the camera track in a position permitting the camera front to be moved wholly past the same, and a camera front stop member proper pivoted on a pivot extending in the direction of the said camera track, directly upon said basal member above said longitudinally extending dove-tailed groove of said camera track, so that said stop member may be manually swung upon its pivot into an inner functioning position in which it acts as a stop for said camera front when the latter is moved along said camera track thereagainst or upon which pivot said track stop may be swung outwardly so that the entire stop is entirely out of the path of movement of said camera front along said track, thereby permitting the camera front to be moved onward lengthwise along said track wholly past said stop member proper and also wholly past said basal member of the said track stop, said track stop being structurally independent of and disassociated from any other stop means that may interfere with the movement of the camera front wholly past said stop member proper and its basal support member.

2. A track stop member in accordance with claim 1, wherein said stop member proper is provided with a pivotal pin extending through said stop member proper and into said basal member above said longitudinally extending dove-tailed groove in said camera track, and upon which pivotal pin said stop member proper may be manually swung into and out of the path of movement of said camera front, said basal member and said stop member proper having interengageable formations to hold said stop member proper in either the inner functioning or the outer non-functioning position of said stop member proper.

3. A track stop member in accordance with claim 1, wherein said stop member proper is provided with a pivotal pin extending through said stop member proper and into said basal member above said longitudinally extending dove-tailed groove in said camera track, and upon which pivotal pin said stop member proper may be manually swung into and out of the path of movement of said camera front, said stop member proper having two spaced superficial recesses and said basal member having a spring actuated detent outwardly movable into engagement with either of said spaced recesses, for holding the said stop member proper in either stopping relation or out of stopping relation with the said camera front.

4. A track stop member in accordance with claim 1, wherein said stop member proper is provided with a pivotal pin extending transversely through said stop member proper and into said basal member, and upon which pivotal pin said stop member proper may be manually swung into and out of the path of movement of said camera front, said stop member having two spaced, superficial recesses and said basal member having a detent to engage either of said recesses, the said detent consisting of a coiled spring having a cap upon the outer end thereof to engage either of said recesses, thereby to hold said stop member proper in either functioning or in non-functioning position.

5. A track stop member in accordance with claim 1, wherein said stop member proper is provided with a pivotal pin extending transversely through said stop member proper and into said basal member, and upon which pivotal pin said stop member proper may be manually swung into and out of the path of movement of said camera front, said stop member proper having two spaced superficial recesses and said basal member having a spring actuated detent outwardly movable into engagement with either of said spaced recesses, for holding the said stop member proper in either stopping relation or out of stopping relation with the said camera front, the said camera track having a longitudinally extending dove-tailed groove to receive the lower part of the said basal member and along which it may be moved and then secured by said track-penetrating means.

JOSEPH A. SPRAGUE.

REFERENCES CITED

The following references are of record in the file of this patent:

UNITED STATES PATENTS

| Number | Name | Date |
|---|---|---|
| 579,126 | Brownell | Mar. 23, 1897 |
| 937,156 | Kroedell | Oct. 19, 1909 |
| 1,524,289 | Christie | Jan. 27, 1925 |
| 2,167,435 | Hineline | July 25, 1939 |
| 2,302,584 | Steiner | Nov. 17, 1942 |
| 2,329,690 | Bolton | Sept. 21, 1943 |
| 2,348,457 | Drehs | May 9, 1944 |
| 2,351,386 | Zucker | June 13, 1944 |
| 2,427,860 | Jensen | Sept. 23, 1947 |
| 2,467,776 | Prentice | Apr. 19, 1949 |

FOREIGN PATENTS

| Number | Country | Date |
|---|---|---|
| 48,692 | Denmark | Apr. 18, 1934 |